(12) United States Patent
Thielmann et al.

(10) Patent No.: US 6,435,364 B1
(45) Date of Patent: Aug. 20, 2002

(54) WALL-MOUNTED INSTALLATION HOUSING

(75) Inventors: Bodo Thielmann, Herborn; Marc Hartel, Reiskirchen; Horst Besserer, Herborn, all of (DE)

(73) Assignee: Rittal-Werk Rudolf Loh GmbH & Co. KG, Herborn (DE)

(*) Notice: Subject to any disclaimer, the term of this patent is extended or adjusted under 35 U.S.C. 154(b) by 0 days.

(21) Appl. No.: 09/646,365

(22) PCT Filed: Mar. 13, 1999

(86) PCT No.: PCT/EP99/01664

§ 371 (c)(1),
(2), (4) Date: Sep. 18, 2000

(87) PCT Pub. No.: WO99/48181

PCT Pub. Date: Sep. 23, 1999

(30) Foreign Application Priority Data

Mar. 18, 1998 (DE) .......................................... 198 11 711

(51) Int. Cl.[7] .................................................. H02G 3/08
(52) U.S. Cl. ...................................... 220/3.92; 220/3.94
(58) Field of Search ............................... 220/3.94, 3.92; 174/49, 50

(56) References Cited

U.S. PATENT DOCUMENTS 3,571,771 A * 3/1971 Stephanson
4,263,472 A * 4/1981 Maheu ....................... 220/3.94
4,323,723 A * 4/1982 Fork et al. .................. 220/3.94
5,568,362 A * 10/1996 Hansson

FOREIGN PATENT DOCUMENTS

| DE | 44 10 795 | 9/1995 |
|---|---|---|
| FR | 2 628 577 | 9/1989 |
| FR | 2 737 055 | 1/1997 |

* cited by examiner

Primary Examiner—Stephen Castellano
(74) Attorney, Agent, or Firm—Pauley Petersen Kinne & Erickson

(57) ABSTRACT

A wall-mounted installation housing for receiving electrical components, having a base part with a floor that can be screwed into the wall. A hood-like cover can be placed onto or over the base part and surrounds an installation space by two side walls, the floor and a cover. To be able to make good use of the available installation space it is possible to fix one or more supports to the base part which protrude from the floor of the base part in the direction of the hood-like cover and support it in relation to the base part. This invention provides supports having an assembly section fitted with fixing recesses to which fittings can be attached such that they face into the installation space.

15 Claims, 3 Drawing Sheets

WALL-MOUNTED INSTALLATION HOUSING

BACKGROUND OF THE INVENTION

1. Field of the Invention

This invention relates to a wall-mounted installation housing for installing electrical components in a base element, which can be screwed to a wall with a back, wherein a hood-like cover can be placed on or over the base element which encloses an installation space with two lateral walls, a bottom side, and a cover side.

2. Description of Related Art

An installation housing is known from German Patent Reference DE 44 10 795 C1. Here, a bent sheet metal element, which has a bottom element oriented parallel with a wall, is used as the base element. The bottom element has several fastening receivers, on which electrical built-ins can be fixed in place and wired together. Following the installation of the built-ins, the installation housing can be closed by the cover. For this purpose the hood-like cover is placed over the base element and fixed in place.

SUMMARY OF THE INVENTION

It is one object of this invention to provide a wall-mountable installation housing of the type mentioned above, wherein the available installation space can be well used with built-ins.

This object is attained with one or several supports that can be fastened on the base element, which project away from the bottom of the base element in the direction toward the cover and which support the cover on the base element. The supports have a mounting section with fastening receivers, on which built-ins can be fastened facing the installation space.

Built-ins can be fixed in place on the supports, spaced at a distance from the bottom of the base element. Thus it is possible to equip the available installation space with built-ins also in the direction of a depth of the installation housing. Thus it is possible for one to achieve a variable occupation of the interior of the installation housing. On the other hand, well arranged wiring is also possible.

In accordance with a preferred embodiment of this invention, the bottom element has at least one lateral flange, which has a recess into which a brush strip can be inserted. The brush strip, together with the edge area of the cover facing the base element, forms a cable inlet close to the wall.

In connection with an installation housing in accordance with this invention it is possible to have supports fastened on two oppositely located sides of the base element, and to project past the base element with the mounting section. It is then possible to fasten mounting rails, for example, on both supports, which extend over an entire width of the installation space. It is conceivable for larger built-ins, which extend over the entire width of the installation space, to be fastened indirectly or directly on the supports. For an orderly cable guidance in the installation housing, mounting section of the supports is designed as a wall which extends parallel with and at a distance from the associated lateral wall. The mounting section has at least one passage for cables, which forms a spatial connection between the installation space and the cable duct formed between the mounting section and the lateral wall.

If standardized component supports are installed in the installation space, then the two supports, which are assigned to the oppositely located sides of the base element, can have component supports with rows of fastening receivers arranged in a separation grid. The component supports can be selectively positioned at two distances from each other, wherein components with a metric installation size can be fastened on the two component supports in the one mounting position, and in the second mounting position components of an installation size can be measured in inches.

For fixing the cover on the base element, one embodiment of this invention provides supports that have a support base designed as a horizontal flange, which rests on the bottom of the base element and is releasably fastened to the base element. The mounting section adjoins the support base at right angles and the mounting section has laterally angled-off support sections on its end facing away from the support base, which protrude in the direction toward the cover and rest against the inner wall of the lateral wall of the cover for supporting the latter parallel with respect to the wall. With its front face facing away from the base element, the support braces the cover vertically in the direction toward the wall.

To achieve a simple and stable design of the cover, an installation housing in accordance with this invention has the lateral walls of the cover provided with horizontal fastening flanges. The bottom side and the cover side also have horizontal fastening flanges, which rest against the fastening flanges of the lateral walls, and the fastening flanges are oriented toward the interior of the housing body and are screwed to each other there.

So that the cover can be fixed simply and without tools, on the base element, the cover can have a lock which works together with a locking element of the base element or of the support for fixing the cover in place. On its front facing away from the base element, the cover can be closed by a door, which is hinged in the area of a side of the cover. The installation space can be made accessible through the door when the cover is mounted. It is possible to provide the door with a viewing window, through which display elements for monitoring the operational state can be read.

BRIEF DESCRIPTION OF THE DRAWINGS

This invention will be explained in greater detail in what follows by an exemplary embodiment represented in the drawings wherein.

DETAILED DESCRIPTION OF PREFERRED EMBODIMENTS

Figure 1:
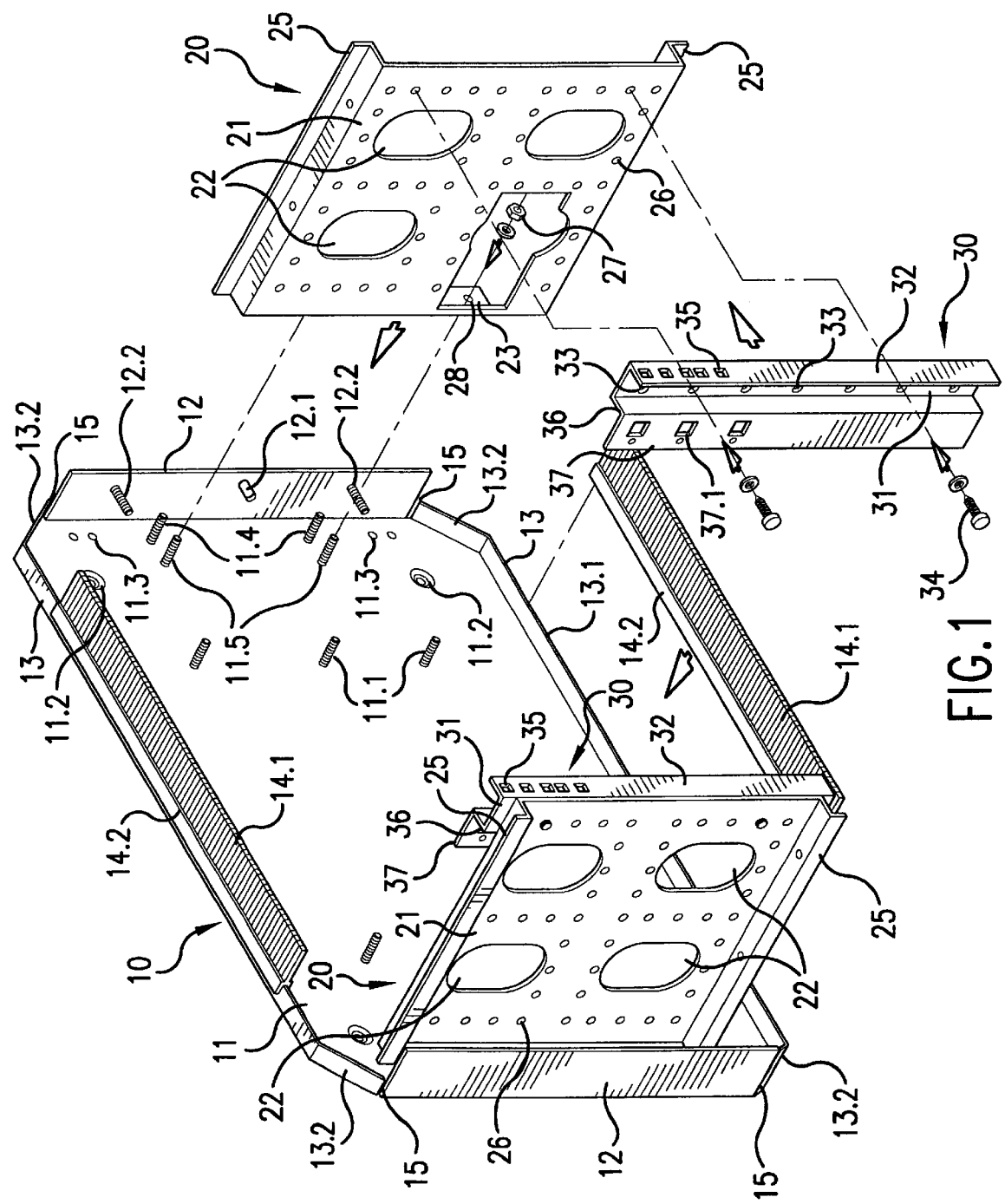
FIG. 1 is a perspective exploded view of a base element with two supports mounted thereon.

A base element 10 is shown in FIG. 1, which can be mounted on a vertical wall. The base element 10 has a vertical back 11, to which flanges 12, 13 are connected at right angles. Brush strips 14.1 are fastened to the horizontally extending flanges 13. The brush strips 14.1 have profiled strips 14.2, which have a slit extending in the longitudinal direction of the profile. The profiled strips 14.2 can be pushed on the edge 13.1 of the flange 13 with the slit. The flanges 13 have inclined sections 13.2 in the transition area facing the flanges 12. A slit 15 extends in the direction vertically toward the back 11 between the inclined sections 13.2 and the flanges 12. As the flange 12 shown at the right in FIG. 1 shows, holders 12.2, in this case threaded bolts facing the-installation space, are fixed on the flange 12. Mounting rails can be fastened on the holders 12.2. The flange has a closing element 12.1 centered between the two holders 12.2.

Fastening receivers 11.2, 11.3 are worked into the back 11 for fastneing the base element 10 on the wall. Fastneing screws can be inserted through the fastening receivers 11.2, 11.3 and screwed into the wall. Threaded bolts 11.1, which extent at right angles with respect to the level of the back 11, are provided for fixing mounting plates on the base element 10 parallel with the back 11. Respectively four further threaded bolts 11.4, 11.5 are fastened on the back 11 in the area of the lateral flanges 12. The threaded bolts 11.4, 11.5 are used for fastening supports 20. The supports 20 are made as stamped and bent elements from a sheet metal blank. The supports 20 have a support base 23 extending parallel with the back 11, which is angled off in the form of a flange from a mounting section 21. The mounting section 21 is embodied as a flat wall, which has sereral rows of fastening receivers 26. Support sections 25, which are angled off in one piece from the mounting section 21, adjoin the horizontal edges of the mounting section 21. Here, the support section 25 extend from the back 11 as far as the free end of the mounting section 21.

The support base 23 of a support 20 has two bores 28. The support 20 can be slipped on the threaded bolts 11.4, 11.5 using the bores 28. As shown in FIG. 1, the support 20 can be selectively fixed in place on one of the two pairs of threaded bolts 11.4 or 11.5. Accordingly, in the different mounting positions the mounting section 21 also is at a different distance from the flange 12. If the two supports 20 are fastened close to the flanges 12, the two mounting sections 21 of the supports 20 are also distant from each other. At this extended spacing it is possible to fasten components of metric dimensions on component supports 30. The component supports 30 are designed as profiled sections having two legs 31, 32 which extend at right angles to each other. In this case the leg 31 rests flat on the mounting section 21. Elongated holes 33 are cut into the leg 31, which can be aligned with the fastening receivers 26 of the mounting section 21. For fixing the component support 30 in place, fastening screws 34 are inserted into the elongated holes 33 and screwed into the fastening receivers 26. The component support 30 can be variably fixed in place in various positions in the depth of the installation housing in accordance with the grid of fastening receivers 26.

Furthermore, by means of the elongated holes 33, the component support 30 can also be adjusted continuously in a direction of the depth of the installation housing.

The leg 32, which is arranged at a right angle with respect to the mounting section 21, also has a row of fastening receivers 35, which are punched out of the leg 32 in the form of square openings. The components can be fastened on the fastening receivers 35. If, in place of components of metric dimensions, it is intended to install components with a measurement in inches, it is necessary to move the supports 20. For this purpose the support base 23 is screwed together with the threaded bolt 11.5. Accordingly, the supports 20 now are only apart from each other by a little distance. This distance then corresponds to the structural measurement by inches of the components.

A fastening shoulder 37 adjoins the leg 31 by means of a strip 36. The fastening shoulder 37 has fastening receivers 37.1 for fixing built-ins in place.

Figure 2:
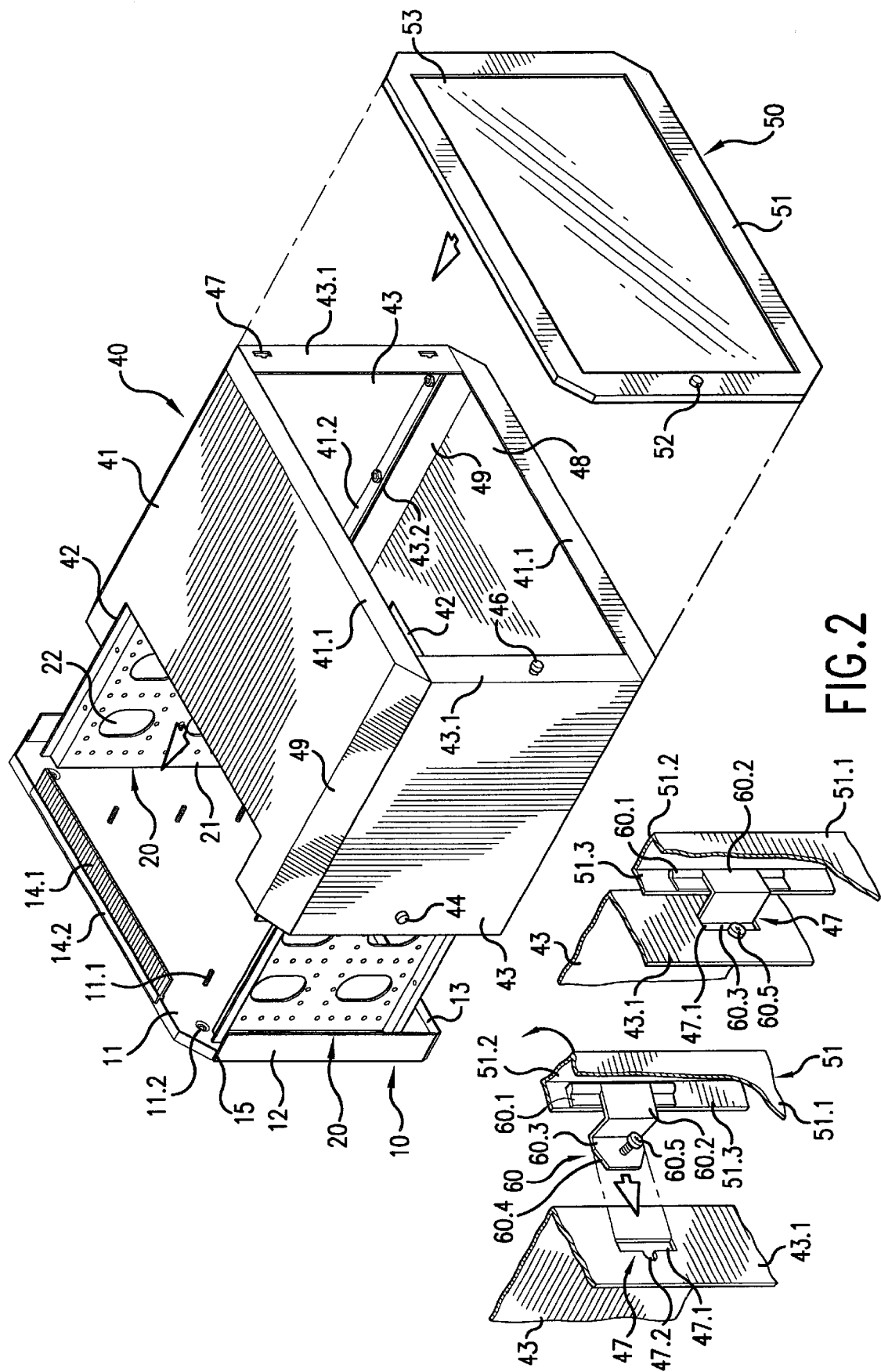
FIG. 2 is a perspective exploded view of an installation housing with the base element in accordance with FIG. 1.

As FIG. 2 shows, a cover 40 can be placed on the base element 10. The cover 40 is designed hoodlike and has two lateral walls 43, a bottom side 41 and a cover side 48. At the front, the lateral walls 43 and the bottom, or respectively the cover sides 41, 48 terminate in angled-off edges 43.1, 41.1. A door 50 can be hinged on the vertically extending edge 43.1 of the left lateral wall 43. The door 50 has a door frame 51, into which a window 53 is adhered. Hinge holders 47 are used for fixing the door 50 in place.

The design of the hinges is shown in greater detail in FIG. 2 by two details. The hinge holder 47 can be seen as a slit 47.1 in these representations. In the center the slit 47.1 is widened by a screw receptacle 47.2. The hinge is fastened on the door frame 51 with a first hinge element 60.1. In cross section, the door frame 51 has two legs 51.1, 51.3, which extend parallel with each other and are connected by a connecting section 51.2. The hinge element 60.1 is fixed by welding on the leg 51.3. The second hinge element 60 is connected with the first hinge element 60.1 by means of a hinge pin. Adjoining the hinge pin, the second hinge element 60 has a spacer element 60.2. The spacer element 60.2 extends beyond the leg 51.3. Adjoining the spacer element 60.2, the second hinge element 60 has a right-angled flange, which transitions into a fastening section 60.3. The fastening section 60.3 extends parallel with the spacer element 60.2.

The fastening section 60.3 has inclined areas 60.4 on the two horizontally extending sides. The inclined areas 60.4 simplify the threading of the fastening section 60.3 into the slit 47.1. When the fastening section 60.3 is pushed into the slit 47.1, its back rests against the edge 43.1. A screw 60.5 is inserted into a screw receptacle of the fastening section 60.3. This screw 60.5 rests against the screw receptacle 47.2. For fixing the hinge in place, the screw 60.5 is displaced in the direction toward the edge 43.1 until its screw head is braced against the edge 43.1.

The unit comprising the cover 40 and the door 50 can be pushed on the base element 10 over the supports 20. In the process the lateral walls 43 extend over the flanges 12. With the cover 40 pushed on, the bottom side and the cover side 48 are passed through the slits 15 by means of angled-off elements 49. In this way the bottom side 41, or respectively the cover side 48, rests against the insides of the edges 13. Locks 44 are provided on both lateral walls 43 for fixing the cover 40 in place. The locks 44 have hook elements, which can be turned behind the locking elements 12.1, as shown in FIG. 1. When the cover 40 is placed, its inside rests on the support sections 25 of the supports 20. The support sections 25 extend behind the cover in the area of the flanges of the bottom side 49, or respectively cover side 48. Because the support sections 25 extend over the entire depth of the mounting section 2 1, the cover 40 can be pushed on simply and without tilting.

Figure 3:
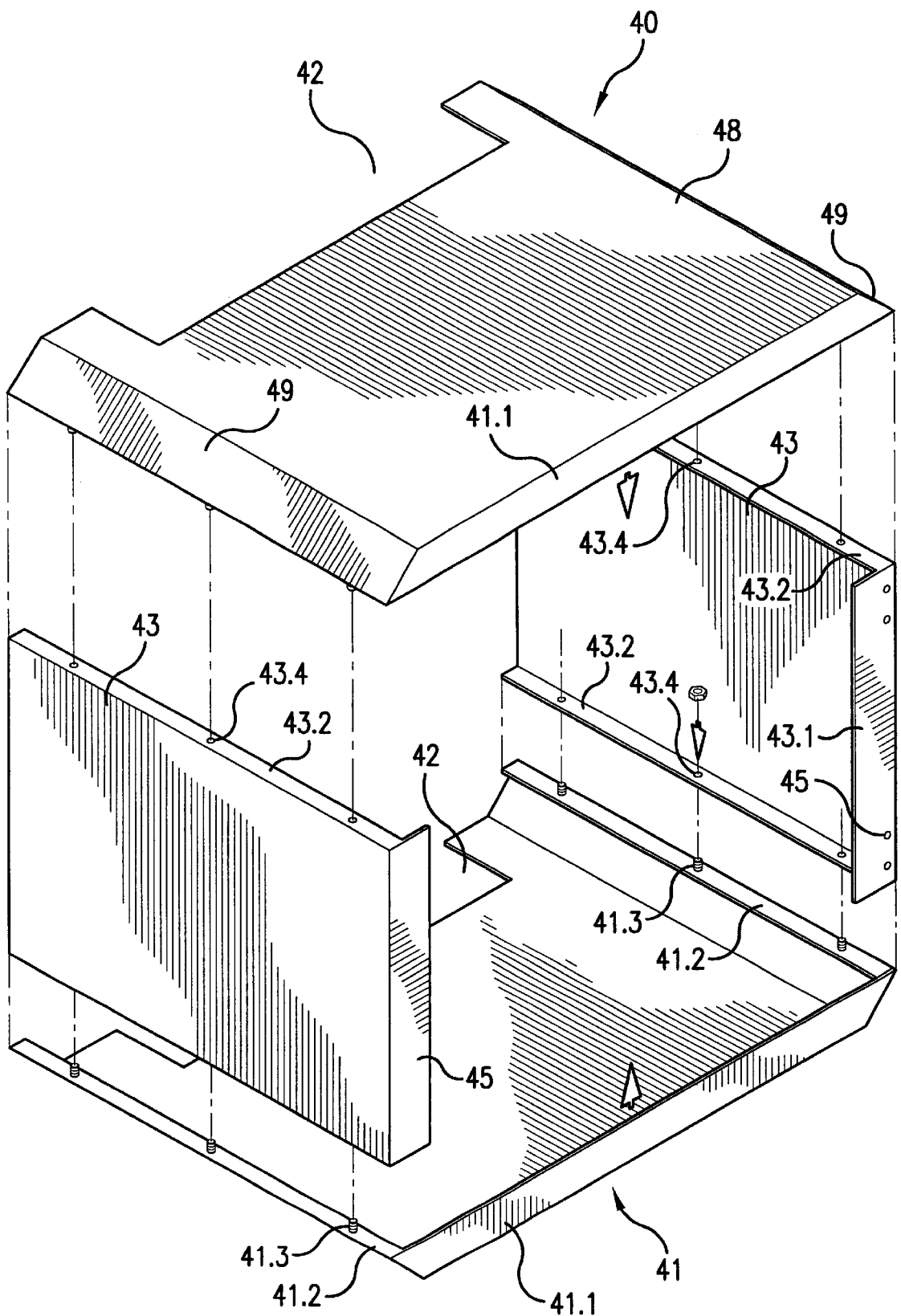
FIG. 3 is a perspective exploded view of a cover for the installation housing shown in FIG. 2.

A cover 40 as shown in FIG. 3, which essentially corresponds to the cover 40 in FIG. 2. In contrast to the cover in accordance with FIG. 2, the cover 40 of FIG. 3 does not have slit-shaped hinge holders 47. Bores 45 for the hinges are provided instead. As can be seen from FIG. 3, the lateral walls 43 have horizontal fastening flanges 43.2, which are provided with bores 43.4. The edge 43.1 is angled of the front of the lateral wall. The bottom side 41 and the cover side 48 also have horizontal fastening flanges 41.2. Stud bolts 41.3 are placed on the fastening flanges 43.2. The bottom side 41, or respectively the cover side 48, is closed at the front by means of the edge 41.1. The bottom side 41 and the cover side 48 are identically embodied. The two lateral walls 43 are also identically embodied.

For installing the cover, the lateral walls 43 with their fastening flanges 43.2 are placed on the fastening flanges 41.2 of the bottom and the cover sides 41, or respectively 48. In the process the stud bolts 41.3 pass through the bores 43.4. Nuts are screwed on the stud bolts 41.3 for fastening.

What is claimed is:

1. In a wall-mounted installation housing for installing electrical components in a base element, which can be screwed to a wall with a back, wherein a cover can be placed on or over the base element which encloses an installation space with two lateral walls, a bottom side, and a cover side, the improvement comprising:

at least one support (20) fastened on the base element (10) and projecting away from the bottom side of the base element (10) in a direction toward a cover (40) and supporting the cover (40) on the base element (10), the at least one support (20) having a mounting section (21) with fastening receivers (26) on which a built-in unit can be fastened facing the installation space, the bottom element (10) having at least one lateral flange (12, 13) with a recess (13.1) into which a brush strip (14.1) is inserted, and the brush strip (14.1) with an edge area of the cover (40) facing the base element (10) forming a cable inlet near the back (11).

2. In the installation housing in accordance with claim 1, wherein the at least one support (20) is fastened on two oppositely located sides of the base element (10) and with the mounting section (21) projects at a right angle beyond the base element (10).

3. In the installation housing in accordance with claim 2, wherein the mounting section (21) is designed as a wall which extends parallel with and at a distance from an associated lateral wall (43) of the two lateral walls, and the mounting section (21) has at least one passage (22) for cables which forms a spatial connection between the installation space and a cable duct formed between the mounting section (21) and the lateral wall (43).

4. In the installation housing in accordance claim 3, wherein the at least one support (20) includes supports assigned to oppositely located sides of the base element (10) have component supports (30) with rows of fastening receivers (35) arranged in a separation grid, and the component supports (30) are selectively positioned at two distances from each other, wherein components with a metric installation size can be fastened on the two component supports (30) in a first mounting position, and in a second mounting position components of an installation size measured in inches can be fastened on the two component supports (30).

5. In the installation housing in accordance with claim 4, wherein the at least one support (20) has a support base (23) designed as a horizontal bevel which rests on the bottom side (11) of the base element (10) and is releasably fastened to the bottom side (11), the mounting section (21) adjoins the support base (23) at a right angle, the mounting section (21) has laterally angled-off support sections (25) on an end facing away from the support base which protrude toward the cover (40) and rest against the inner wall of one of the lateral walls of the cover (40) for supporting the cover (40), and with a front face facing away from the base element (10), the at least one support (20) braces the cover (40) vertically toward the wall.

6. In the installation housing in accordance with claim 5, wherein the lateral walls (43) of the cover (40) have horizontal fastening flanges (43.2), the bottom side (41) and the cover side (48) have horizontal fastening flanges (41.2) which rest against the fastening flanges (43.2) of the lateral walls (43), and the fastening flanges (41.2, 43.2) are oriented toward an interior of a housing body and are screwed to each other.

7. In the installation housing in accordance with claim 6, wherein the cover (40) has at least one lock (44) which works together with a locking element (12.1) of one of the base element (10) and the support (20) for fixing the cover (40) in place on the base element (10).

8. In the installation housing in accordance with claim 7, wherein the front of the cover ( facing away from the base element (10) is closed by a door (50) which is hinged in an area of a side of the cover (40).

9. In the installation housing in accordance with claim 1, wherein the mounting section (21) is designed as a wall which extends parallel with and at a distance from an associated lateral wall (43) of the two lateral walls, and the mounting section (21) has at least one passage (22) for cables which forms a spatial connection between the installation space and a cable duct formed between the mounting section (21) and the lateral wall (43).

10. In the installation housing in accordance with claim 1, wherein the at least one support (20) has a support base (23) designed as a horizontal bevel which rests on the bottom side (11) of the base element (10) and is releasably fastened to the bottom side (11), the mounting section (21) adjoins the support base (23) at a right angle, the mounting section (21) has laterally angled-off support sections (25) on an end facing away from the support base which protrude toward the cover (40) and rest against an inner wall of one of the lateral walls of the cover (40) for supporting the cover (40), and with a front face facing away from the base element (10), the at least one support (20) braces the cover (40) vertically toward the wall.

11. In the installation housing in accordance with claim 1, wherein the cover (40) has at least one lock (44) which works together with a locking element (12.1) of one of the base element (10) and the support (20) for fixing the cover (40) in place on the base element (10).

12. In the installation housing in accordance with claim 1, wherein the front of the cover (40) facing away from the base element (10) is closed by a door (50) which is hinged in an area of a side of the cover (40).

13. In a wall-mounted installation housing for installing electrical components in a base element, which can be screwed to a wall with a back, wherein a cover can be placed on or over the base element which encloses an installation space with two lateral walls, a bottom side, and a cover side, the improvement comprising:

at least one support (20) fastened on the base element (10) and projecting away from the bottom side of the base element (10) in a direction toward a cover (40) and supporting the cover (40) on the base element (10), and the at least one support (20) having a mounting section (21) with fastening receivers (26) on which a built-in unit can be fastened facing the installation space, the at least one support (20) includes supports assigned to oppositely located sides of the base element (10) having component supports (30) with rows of fastening receivers (35) arranged in a separation grid, and the component supports (30) selectively positioned at two distances from each other, wherein components with a metric installation size can be fastened on the two component supports (30) in a first mounting position, and in a second mounting position components of an installation size measured in inches can be fastened on the two component supports (30).

14. In the installation housing in accordance with claim 13, wherein the at least one support (20) is fastened on two oppositely located sides of the base element (10) and with the mounting section (21) projects at a right angle beyond the base element (10).

15. In a wall-mounted installation housing for installing electrical components in a base element, which can be screwed to a wall with a back, wherein a cover can be placed on or over the base element which encloses an installation space with two lateral walls, a bottom side, and a cover side, the improvement comprising:

at least one support (20) fastened on the base element (10) and projecting away from the bottom side of the base element (10) in a direction toward a cover (40) and supporting the cover (40) on the base element (10), and the at least one support (20) having a mounting section (21) with fastening receivers (26) on which a built-in unit can be fastened facing the installation space, lateral walls (43) of the cover (40) having horizontal fastening flanges (43.2), the bottom side (41) and the cover side (48) having horizontal fastening flanges (41.2) which rest against the fastening flanges (43.2) of the lateral walls (43), and the fastening flanges (41.2, 43.2) oriented toward an interior of a housing body and screwed to each other.

* * * * *